United States Patent
Huang et al.

(10) Patent No.: US 8,373,396 B2
(45) Date of Patent: Feb. 12, 2013

(54) ADAPTIVE TWO-STAGE VOLTAGE REGULATOR AND METHOD FOR TWO-STAGE VOLTAGE REGULATION

(75) Inventors: Tsung-Wei Huang, Taipei (TW);
Shui-Mu Lin, Taichung (TW);
Chueh-Kuei Jan, Chupei (TW);
Huan-Chien Yang, Yonghe (TW)

(73) Assignee: Richtek Technology Corporation, HsinChu (TW)

( * ) Notice: Subject to any disclaimer, the term of this patent is extended or adjusted under 35 U.S.C. 154(b) by 337 days.

(21) Appl. No.: 12/781,995

(22) Filed: May 18, 2010

(65) Prior Publication Data

US 2011/0285366 A1 Nov. 24, 2011

(51) Int. Cl.
*G05F 1/00* (2006.01)

(52) U.S. Cl. .................... 323/271; 323/270; 323/274

(58) Field of Classification Search ................ 323/266, 323/270, 271, 274
See application file for complete search history.

(56) References Cited

U.S. PATENT DOCUMENTS

| | | | | |
|---|---|---|---|---|
| 6,850,047 | B2 * | 2/2005 | Itabashi et al. | 323/284 |
| 7,026,800 | B2 * | 4/2006 | Liu et al. | 323/270 |
| 7,161,335 | B2 * | 1/2007 | Wei et al. | 323/266 |
| 7,173,400 | B2 * | 2/2007 | Morioka | 323/266 |
| 8,154,262 | B2 * | 4/2012 | Kanayama | 323/266 |
| 2007/0217238 | A1 * | 9/2007 | Kanayama | 363/125 |
| 2010/0134078 | A1 * | 6/2010 | Murakami et al. | 323/271 |
| 2011/0084676 | A1 * | 4/2011 | Lin et al. | 323/283 |

* cited by examiner

*Primary Examiner* — Adolf Berhane
*Assistant Examiner* — Gary Nash
(74) *Attorney, Agent, or Firm* — Tung & Associates

(57) ABSTRACT

The present invention discloses an adaptive two-stage voltage regulator and a method for controlling the same. The adaptive two-stage voltage regulator includes: a voltage regulator for converting an input voltage (Vin) to a middle voltage (Vm), wherein Vin≦Vin_max; a linear regulator for converting the middle voltage to an output voltage (Vout); and a middle voltage controller for adjusting the middle voltage according to (1) an input voltage indicator and one of (2a) an output voltage indicator and (2b) a predetermined reference signal, such that when Vin≦Vout, Vm=Vout+ΔV and (Vout+ΔV) <Vin_max.

13 Claims, 6 Drawing Sheets

ADAPTIVE TWO-STAGE VOLTAGE REGULATOR AND METHOD FOR TWO-STAGE VOLTAGE REGULATION

BACKGROUND OF THE INVENTION

1. Field of Invention

The present invention relates to an adaptive two-stage voltage regulator and a method for adaptive two-stage voltage regulation; particularly, it relates to an adaptive two-stage voltage regulator and a relevant method capable of adaptively adjusting a middle voltage according to a relationship between an input voltage and an output voltage, for reducing power consumption.

2. Description of Related Art

Referring to FIG. 1, in certain applications, it is required to perform two-stage voltage regulation in a power converter, wherein an input voltage is first converted to a middle voltage Vm, and the middle voltage Vm is next converted to an output voltage Vout. More specifically, in such two-stage voltage regulation, a first stage voltage regulator 10 is provided for voltage conversion with high efficiency, and a second stage linear regulator 20 is provided for filtering the ripple noise in the middle voltage Vm. For example, when a load circuit is an Active-Matrix Organic LED (AMOLED), the two-stage voltage regulator may be required.

Taking the load circuit being AMOLED as an example, in one application, the required output voltage Vout is 4.6V, while the input voltage Vin is a battery voltage which may vary between 2.5-4.8V; the voltage regulator 10 is a boost converter. Referring to FIG. 2, since the input voltage Vin may be 4.8V, to ensure that the boost converter operates normally, the output voltage Vm of the voltage regulator 10 is set to be 4.9V (the output voltage of the boost regulator must be higher than its input voltage; if the voltage Vm is set to be equal to or lower than 4.8V, the boost converter can not operate when the input voltage Vin is 4.8V). Next, a linear regulator 20 converts the middle voltage Vm (4.9V) to the output voltage Vout (4.6V).

In the foregoing arrangement, as shown in the drawing, when the input voltage Vin is in the range of 2.5-4.6V, a voltage difference ΔV of 0.3V (4.9V-4.6V=0.3V) is generated, which increases the power consumption of the circuit.

In view of the drawback of the foregoing prior art, the present invention provides an adaptive two-stage voltage regulator and a method for adaptive two-stage voltage regulation to reduce power consumption.

SUMMARY OF THE INVENTION

An objective of the present invention is to provide an adaptive two-stage voltage regulator.

Another objective of the present invention is to provide a method for adaptive two-stage voltage regulation.

To achieve the foregoing objectives, in one perspective of the present invention, it provides an adaptive two-stage voltage regulator, comprising: a voltage regulator for converting an input voltage (Vin) to a middle voltage (Vm), wherein the input voltage is smaller than or equal to a maximum value (Vin_max), Vin≦Vin_max; a linear regulator for converting the middle voltage to an output voltage (Vout); and a middle voltage controller for adjusting the middle voltage according to (1) an input voltage indicator and one of (2a) an output voltage indicator and (2b) a predetermined reference signal, such that when Vin≦Vout, Vm=Vout+ΔV and (Vout+ΔV)<Vin_max.

In another perspective, the present invention provides a method for adaptive two-stage voltage regulation, comprising: converting an input voltage (Vin) to a middle voltage (Vm), wherein the input voltage is smaller than or equal to a maximum value (Vin_max), Vin≦Vin_max; converting the middle voltage to an output voltage (Vout); adjusting the middle voltage according to (1) an input voltage indicator and one of (2a) an output voltage indicator and (2b) a predetermined reference signal, such that when Vin≦Vout, Vm=Vout+ΔV and (Vout+ΔV)<Vin_max.

In the foregoing adaptive two-stage voltage regulator or the method therefor, when Vin>Vout, Vm may be one of the following waveforms: one-step waveform, multi-step waveform, irregular waveform, or a ramp waveform wherein Vm=Vin+ΔV.

When Vm is a one-step or multi-step waveform, the input voltage indicator can be compared with one of (2a) the output voltage indicator and (2b) the predetermined reference signal, and a reference voltage to be provided to the voltage regulator is selected according to the comparison result.

When Vm=Vin+ΔV, in one embodiment, the input voltage indicator and the output voltage indicator can be converted to current signals, and next the output voltage indicator is subtracted from the input voltage indicator. The positive difference acquired is converted to a voltage signal and added to a reference voltage, and the sum is provided to the voltage regulator.

The objectives, technical details, features, and effects of the present invention will be better understood with regard to the detailed description of the embodiments below, with reference to the drawings.

DESCRIPTION OF THE PREFERRED EMBODIMENTS

Figure 1:
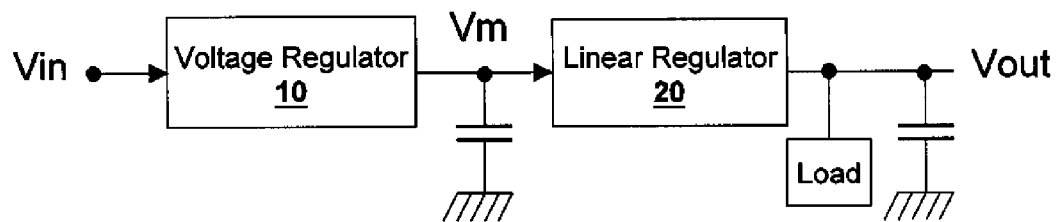
FIG. 1 shows a schematic circuit diagram of the prior art adaptive two-stage voltage regulator.
Figure 2:
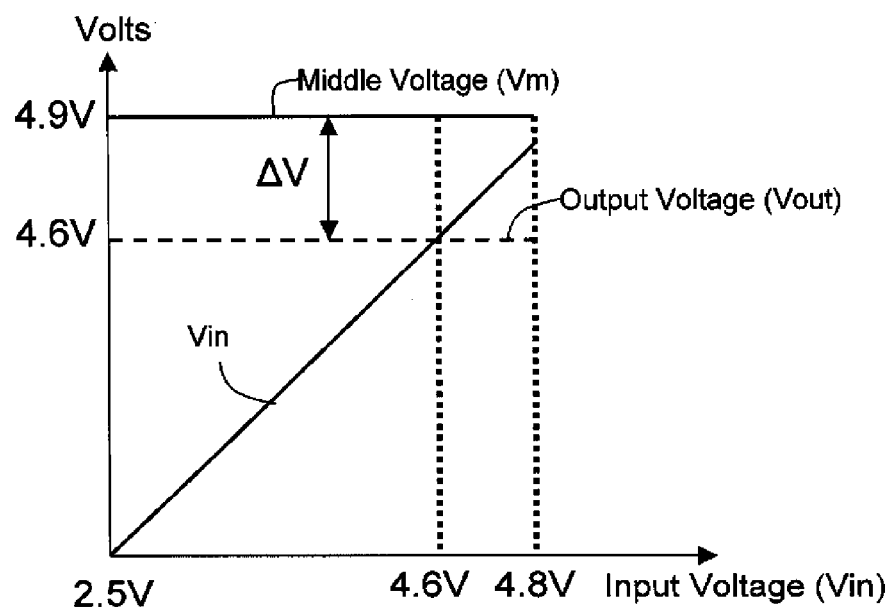
FIG. 2 shows relationships among an input voltage Vin, a middle voltage Vm, and an output Vout in the prior art.
Figure 3:
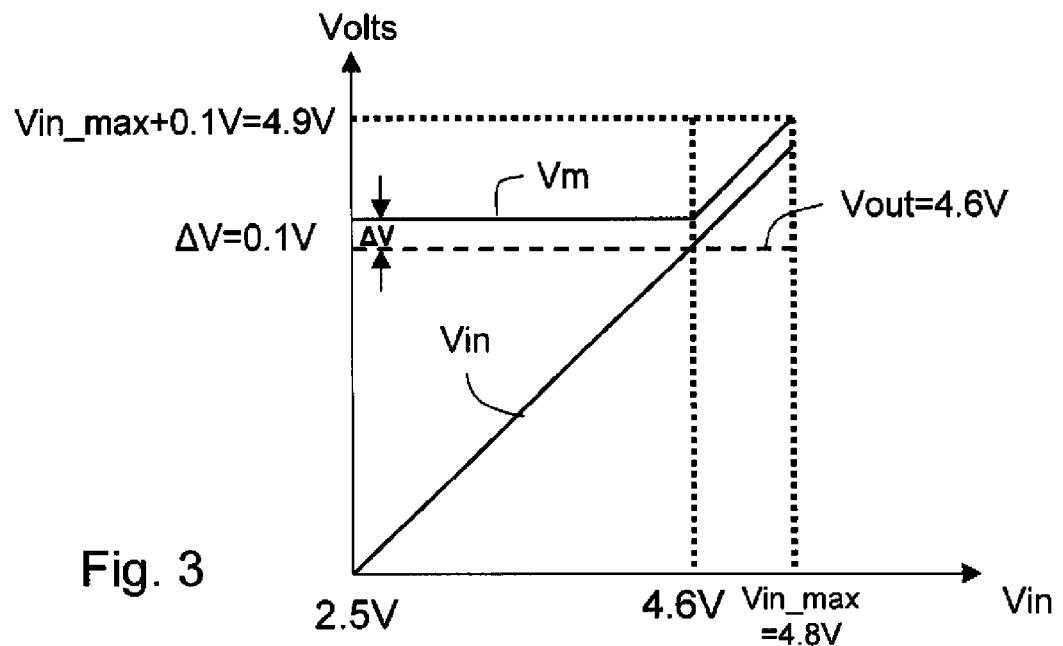
FIGS. 3-6 are several embodiments of the present invention, which show relationships among the input voltage Vin, the middle voltage Vm, and the output Vout.

FIG. 3 shows a first embodiment of the present invention. For easier comparison with the prior art shown in FIG. 2, let us assume that the input voltage Vin varies between 2.5-4.8V, and the required output voltage Vout is 4.6V. However, the same spirit is applicable to all voltage ranges, that is, the output voltage Vout is not necessarily 4.6V and the maximum value of the input voltage Vin_max is not necessarily 4.8V.

As shown in FIG. 3, this embodiment is characterized in that the middle voltage Vm varies adaptively according to the input voltage Vin and the output voltage Vout. When the input voltage Vin is smaller than or equal to the output voltage Vout, the middle voltage Vm is equal to a sum of the output voltage Vout plus a small voltage difference ΔV, where (Vout+ΔV)

<Vin_max and the voltage difference ΔV is preferably as smallest as possible, such as 0.1V. When the input voltage Vin is higher than or equal to the output voltage Vout, the middle voltage Vm is equal to a sum of the input voltage Vin plus the voltage difference ΔV. To sum up, the middle voltage Vm can be indicated as below:

$$Vm=Vout+\Delta V, \text{ and } (Vout+\Delta V)<Vin\_max, \text{ when } Vin \leq Vout \quad (1)$$

$$Vm=Vin+\Delta V, \text{ when } Vin>Vout \quad (2)$$

Figure 4:
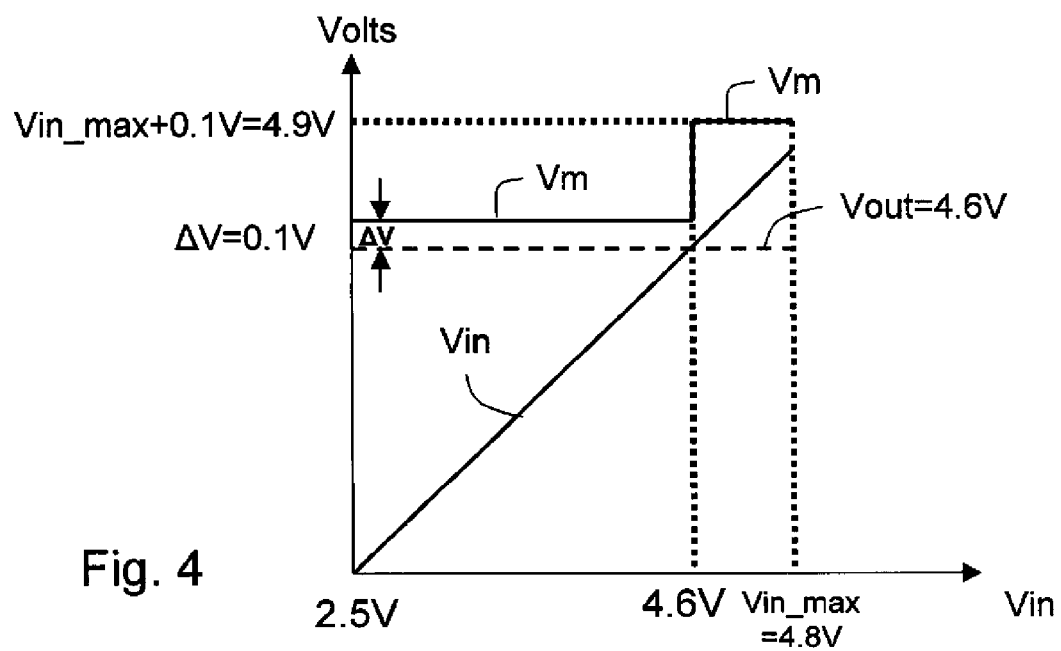
Figure 5:
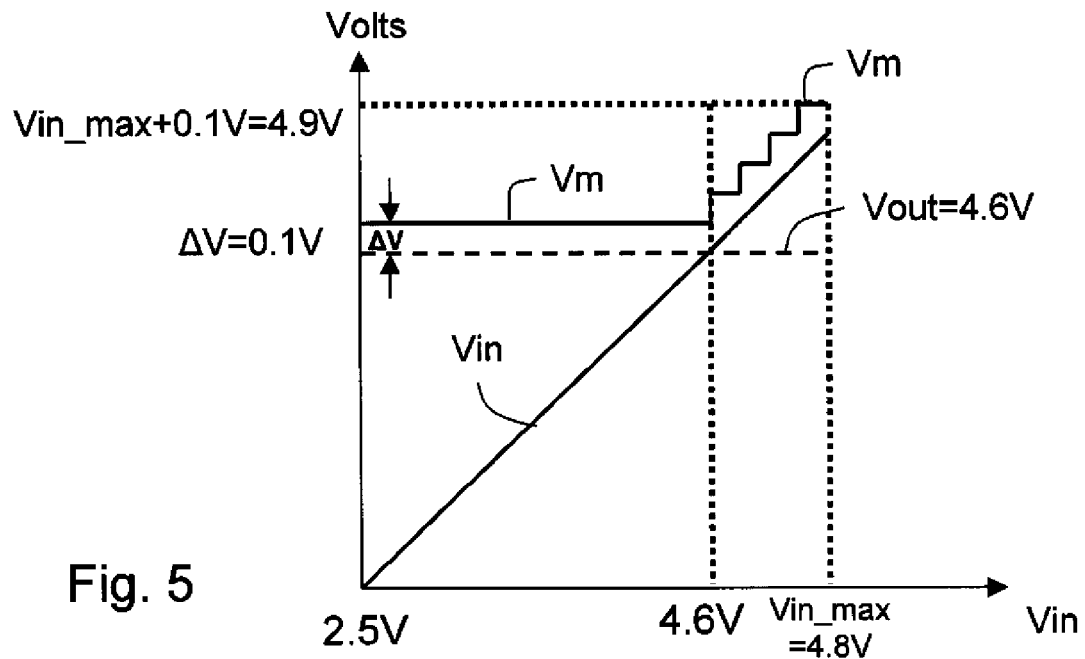
Figure 6:
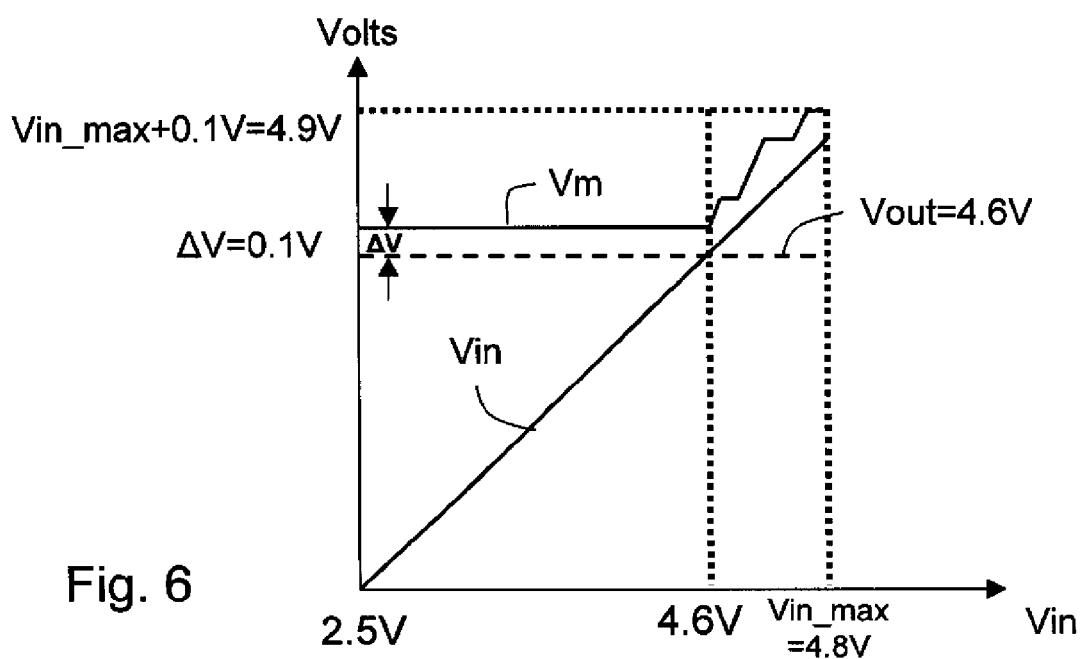

FIG. 3 shows the best mode embodiment of the present invention for power saving. However, the present invention is not limited thereto. When the input voltage Vin is higher than the output voltage Vout, the middle voltage Vm does not necessarily have to be equal to the sum of the input voltage Vin and the voltage difference ΔV, and for example it can be a one-step waveform shown in FIG. 4 or a multi-step waveform shown in FIG. 5. Comparing the embodiments shown in FIGS. 4 and 5 with the prior art shown in FIG. 2, the embodiments as shown are still preferable for power saving. Furthermore, the middle voltage Vm can even be an irregular waveform when the input voltage Vin is higher than the output voltage Vout, such as the example shown in FIG. 6.

Figure 7:
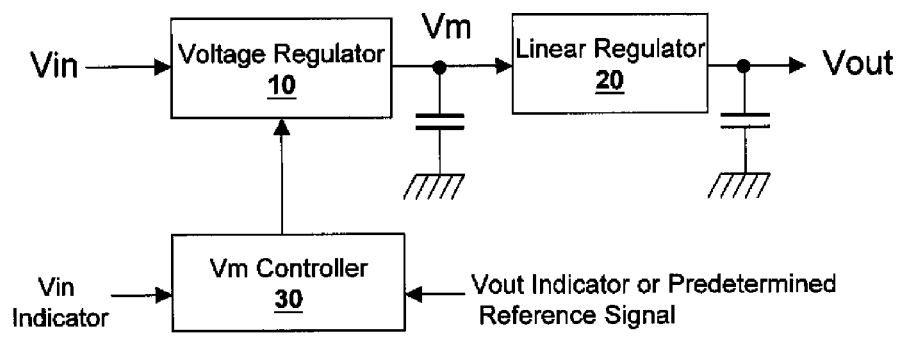
FIG. 7 is a schematic circuit diagram showing an adaptive two-stage voltage regulator of the present invention.

One hardware embodiment for embodying the foregoing waveforms is shown in FIG. 7. In addition to the voltage regulator 10 and the linear regulator 20, a middle voltage (Vm) controller 30 is provided. The Vm controller 30 adjusts the middle voltage Vm according to (1) an input voltage indicator (Vin indicator) and one of (2a) an output voltage indicator (Vout indicator) and (2b) a predetermined reference signal. The Vin indicator for example can be a dividend voltage of the input voltage Vin, a current signal converted from the input voltage Vin, a multiple or fraction of the foregoing dividend voltage or current signal, or certainly the input voltage Vin itself. Likely, the Vout indicator can be any of the above forms similar to the Vin indicator. The predetermined reference signal can be a constant, to be explained later.

Figure 8:
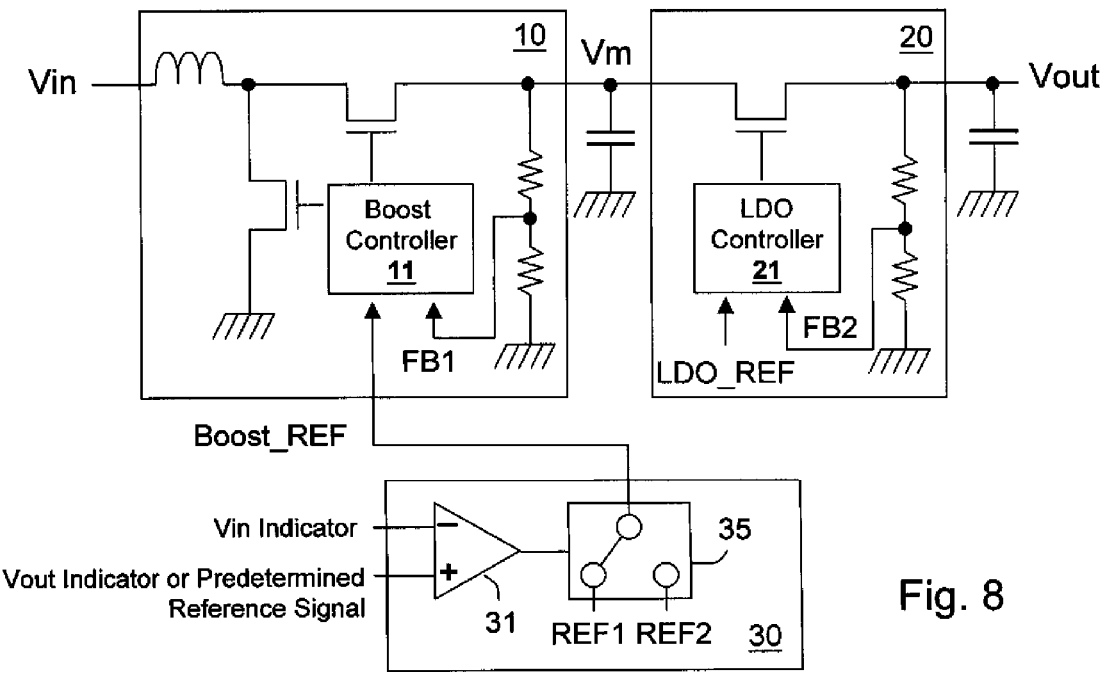
FIG. 8 shows, by way of example, a hardware embodiment corresponding to FIG. 4.

To achieve the desired Vm waveform, the circuit diagram shown in FIG. 7 can be embodied by various hardware forms. For example, the Vm waveform in FIG. 4 can be embodied by the hardware shown in FIG. 8. Assuming that the voltage regulator 10 is a boost converter, a boost controller 11 controls the operation of the power switches according to the comparison between a feedback signal FB1 and a reference voltage Boost_REF, to determine the middle voltage Vm. And assuming that the linear regulator 20 is a low drop-out (LDO) regulator, an LDO control circuit 21 controls the operation of a power switch according to the comparison between a feedback signal FB2 and a reference voltage LDO REF, to determine the output voltage Vout. The Vm controller 30 includes a comparator 31 and a selection circuit 35, wherein the comparator 31 compares the Vin indicator with the Vout indicator, or compares the Vin indicator with the predetermined reference signal. The selection circuit 35 selects one of the reference voltages REF1 and REF2 to be the reference voltage Boost_REF for the boost controller 11. Referring to FIG. 8 in conjunction with FIG. 4, if the input voltage Vin varies between 2.5-4.8V and the required output voltage Vout is 4.6V, when the selection circuit 35 selects one of the two reference voltages REF1 and REF2, the middle voltage Vm is equal to the sum of 4.6V plus a voltage difference ΔV as smallest as possible (e.g., 0.1V). When the selection circuit 35 selects the other one of the two reference voltages REF1 and REF2, the middle voltage Vm is equal to the sum of 4.8V plus the voltage difference ΔV.

Thus, in FIG. 8, the comparator 31 determines when the middle voltage Vm switches to a next level. If the positive input of the comparator 31 is a constant "predetermined reference signal", this "predetermined reference signal" should be determined in correspondence with the level of the input voltage Vin where the middle voltage Vm switches to the next level in FIG. 4. In this embodiment, if (Vin indicator/Vin)=α, then the predetermined reference signal=α·(4.6V).

Figure 9:
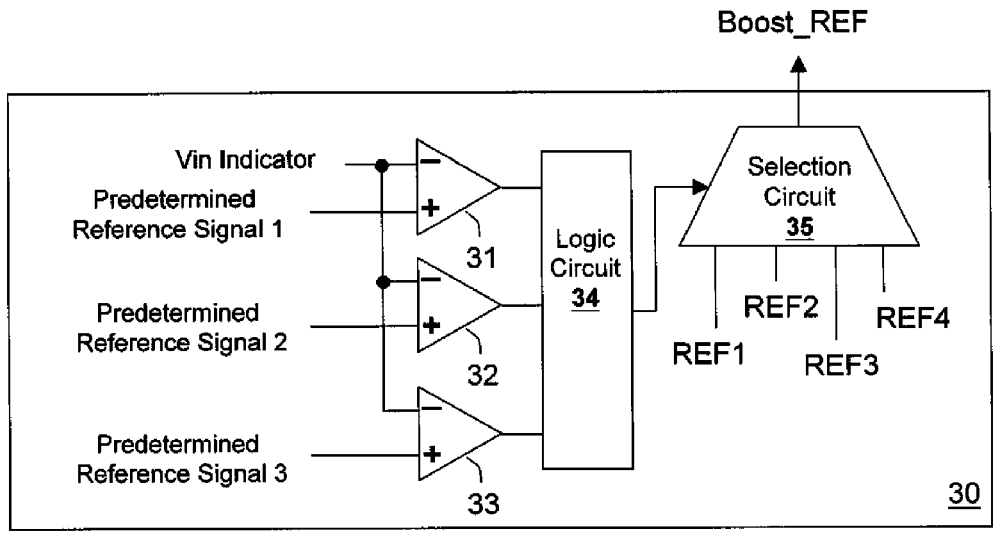
FIG. 9 shows s, by way of example, a hardware embodiment corresponding to FIG. 5.

FIG. 9 shows another hardware embodiment of the present invention. The details of the voltage regulator 10 and the linear regulator are omitted here, but it is still assumed that the voltage regulator 10 is a boost converter and the linear regulator 20 is an LDO regulator. This embodiment corresponds to the Vm waveform shown in FIG. 5, wherein the Vm controller 30 includes multiple comparators 31~33, a logic circuit 34, and a selection circuit 35. The comparators 31-33 respectively compare the Vin indicator with constant predetermined reference signals 1-3, and a logic circuit 34 performs logic operation on the comparison results, to determine which one of the reference voltages REF1-REF4 should be selected by the selection circuit 35 as the reference voltage Boost_REF. In this embodiment, the numbers of the comparators and the reference voltages are for example only; they can be determined according to the number of the steps of the Vm waveform. Similar to the previous embodiment, the predetermined reference signals 1-3 are determined in correspondence with the levels of the input voltage Vin where the middle voltage Vm switches to a next level in FIG. 5.

Figure 10:
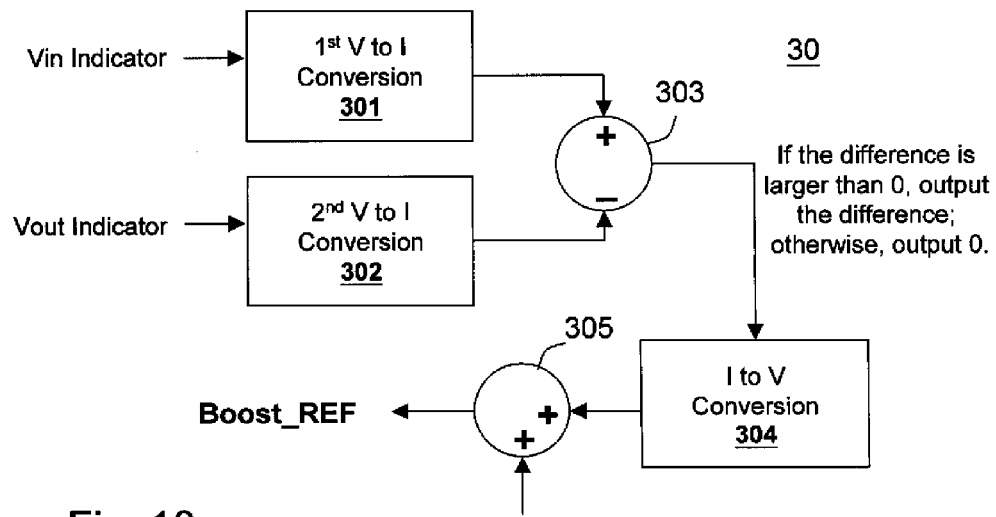
FIG. 10 shows s, by way of example, a hardware embodiment corresponding to FIG. 3.

FIG. 10 shows another embodiment of the present invention. This embodiment illustrates a Vm controller 30 corresponding to the Vm waveform shown in FIG. 3. The Vm controller 30 includes a first voltage to current conversion circuit 301, a second voltage to current conversion circuit 302, a subtraction circuit 303, a current to voltage conversion circuit 304, and an adder circuit 305. When Vin<Vout, VREF is the reference voltage in the voltage regulator 10, such that the middle voltage Vm generated from the voltage regulator 10 is equal to a sum of 4.6V plus a voltage difference ΔV. As shown in the drawing, the first voltage to current conversion circuit 301 converts the Vin indicator to a first current signal and the second voltage to current conversion circuit 302 converts the Vout indicator to a second current signal. Certainly, if the Vin indicator and the Vout indicator are already current signals, not voltage signals, the first and second voltage to current conversion circuits 301 and 302 are not required. The subtraction circuit 303 subtracts the second current signal converted from the Vout indicator from the first current signal converted from the Vin indicator, and outputs the difference when the difference is positive, but outputs zero when the difference is negative. The current to voltage conversion circuit 304 converts the positive difference to a voltage signal. Subsequently, an adder circuit 305 adds the voltage signal to the reference voltage VREF, to generate a reference voltage Boost_REF to be provided to the voltage regulator 10 for adjusting the middle voltage Vm shown in FIG. 3: When Vin≤Vout, Vm=4.6V+ΔV; and when Vin>Vout, Vm=Vin+ΔV.

The circuit diagram shown in FIG. 10 can be embodied in many forms. For example, referring to FIG. 11, an enable switch SW1 is provided, so that the operation of the Vm controller 30 can be enabled or disabled flexibly according to a signal EN. The signal EN for example can be an external control signal, or any signal from any other source. When the enable switch SW1 is turned on, if Vin>Vout, a switch SW2 is turned on; a current IR1 flows through a resistor RS1, and a current IR3 flows through a resistor RS3, wherein IR3=(Vin−Vout)/RS1. A voltage IR3×RS3 is generated across the resistor RS3, which is added onto the reference voltage VREF, that is, Boost_REF=VREF+IR3×RS3. When Vin<Vout, the switch SW2 is turned off, IR3=0, and Boost_REF=VREF.

Figure 11:
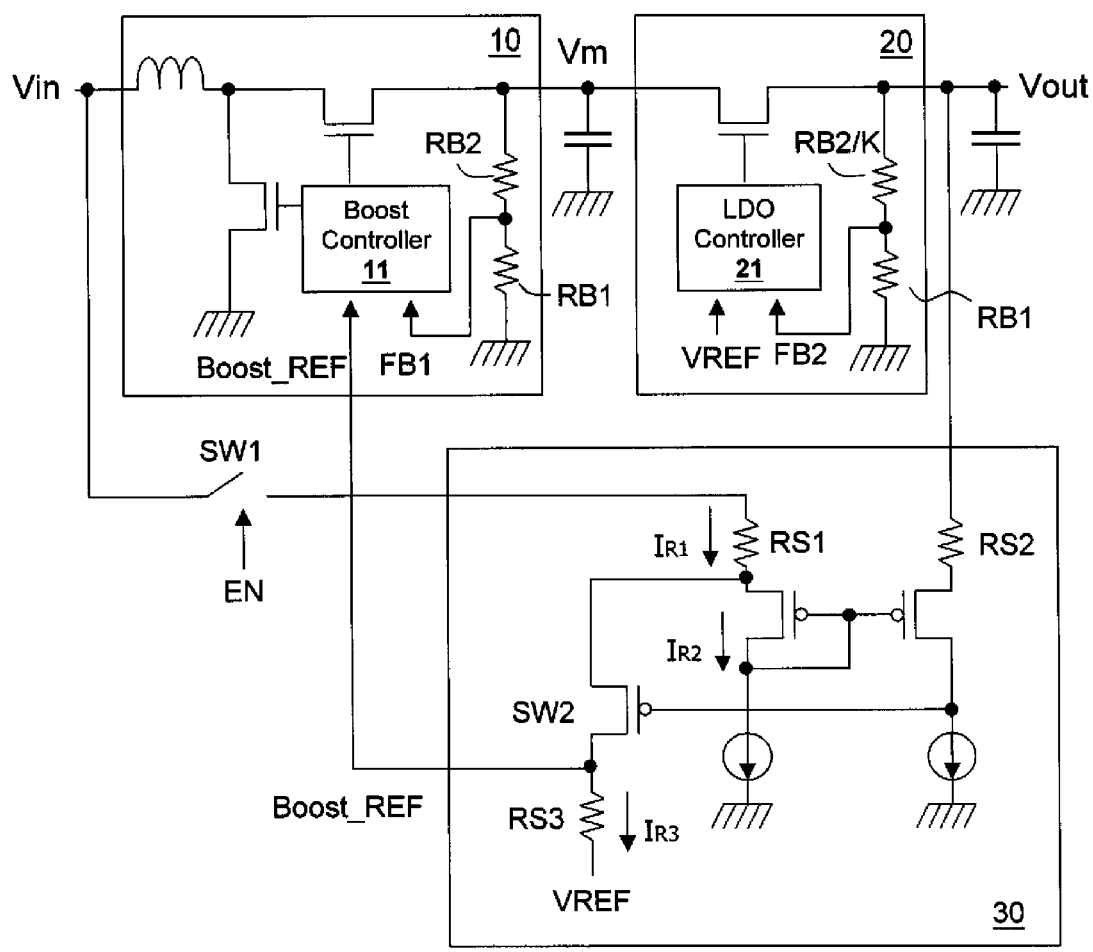
FIG. 11 shows a more specific embodiment of FIG. 10.

In the embodiment shown in FIG. 11, the voltage difference ΔV can be set to any desired value. More specifically:

$$Vm = FB1 \times (RB1 + RB2)/RB1$$
$$= (Boost\_REF) \times (RB1 + RB2)/RB1$$
$$= (VREF + IR3 \times RS3) \times (RB1 + RB2)/RB1$$
$$= [VREF + (Vin - Vout) \times RS3/RS1] \times (RB1 + RB2)/RB1$$

$$Vout = FB2 \times (RB1 + RB2/K)/RB1$$
$$= (VREF) \times (RB1 + RB2/K)/RB1$$

As shown in the above, if it is desired to set the difference voltage ΔV to, e.g., 0.1V, this can be achieved by setting the resistances of the resistors. For example, the value K can be set as RB2/(RB2−0.1×RB1), and the resistances of the resistors RS1-RS3 can be set correspondingly.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. As one example, an additional circuit device which does not substantially affect the primary function of the circuit can be interposed between two devices shown to be in direct connection in the embodiments of the present invention; for example, a scaler circuit, an analog to digital converter, or a digital to analog converter can be interposed in the embodiment shown in FIG. 10. As another example, the first stage voltage is not limited to boost converter, but can be any type of voltage switching regulator. In view of the foregoing, the spirit of the present invention should cover all such and other modifications and variations, which should be interpreted to fall within the scope of the following claims and their equivalents.

What is claimed is:

1. An adaptive two-stage voltage regulator, comprising:
a voltage regulator for converting an input voltage (Vin) to a middle voltage (Vm), wherein the input voltage is smaller than or equal to a maximum value (Vin_max), Vin≦Vin_max;
a linear regulator for converting the middle voltage to an output voltage (Vout); and
a middle voltage controller for adjusting the middle voltage according to
(1) an input voltage indicator and
one of (2a) an output voltage indicator and
(2b) a predetermined first reference signal,
wherein the input voltage indicator and the output voltage indicator or the predetermined first reference signal determines a second reference signal which is supplied to the voltage regulator, such that when Vin≦Vout, Vm=Vout+ΔV and (Vout+ΔV)<Vin_max.

2. The adaptive two-stage voltage regulator of claim 1, wherein when Vin>Vout, Vm is a one-step or multi-step waveform.

3. The adaptive two-stage voltage regulator of claim 1, wherein when Vin>Vout, Vm=Vin+ΔV.

4. The adaptive two-stage voltage regulator of claim 1, wherein the middle voltage controller includes:
a comparator for comparing (1) the input voltage indicator and one of (2a) the output voltage indicator and (2b) the predetermined first reference signal; and
a selection circuit for selecting the second reference signal to be provided to the voltage regulator according to the comparison result.

5. The adaptive two-stage voltage regulator of claim 1, wherein the middle voltage controller includes:
multiple comparators for comparing the input voltage indicator with multiple predetermined reference signals;
a logic circuit performing a logic operation on the outputs of the multiple comparators; and
a selection circuit for selecting the second reference signal to be provided to the voltage regulator according to an output of the logic circuit.

6. The adaptive two-stage voltage regulator of claim 1, wherein the middle voltage controller includes:
a subtraction circuit for subtracting the output voltage indicator from the input voltage indictor, and outputting the difference when the difference is positive, but not outputting the difference or outputting zero when the difference is negative;
a conversion circuit for converting the positive difference to a voltage signal; and
an adder circuit for adding the voltage signal converted from the positive difference to a third reference signal to determine the second reference signal which is supplied to the voltage regulator to adjust the middle voltage.

7. The adaptive two-stage voltage regulator of claim 6, wherein the middle voltage controller further includes:
a first voltage to current converter for converting the input voltage indicator to a first current signal, and a second voltage to current converter for converting the output signal indicator to a second current signal, the first and second current signals being inputted to the subtraction circuit.

8. A method for adaptive two-stage voltage regulation, comprising:
converting an input voltage (Vin) to a middle voltage (Vm), wherein the input voltage is smaller than or equal to a maximum value (Vin_max), Vin≦Vin_max;
converting the middle voltage to an output voltage (Vout);
adjusting the middle voltage according to
(1) an input voltage indicator and
one of (2a) an output voltage indicator and
(2b) a predetermined first reference signal, wherein the input voltage indicator and [the output voltage indicator or the predetermined first reference signal ] determines a second reference signal which is supplied to the voltage regulator, such that when Vin≦Vout, Vm=Vout+ΔV and (Vout+ΔV)<Vin_max.

9. The method of claim 8, wherein when Vin>Vout, Vm is a one-step or multi-step waveform.

10. The method of claim 9, wherein the step of adjusting the middle voltage includes:
subtracting the output voltage indicator from the input voltage indictor, and outputting the difference when the difference is positive, but not outputting the difference or outputting zero when the difference is negative;
converting the positive difference to a voltage signal; and
adding the voltage signal converted from the positive difference to a third reference signal to determine the second reference signal which is supplied to the voltage regulator to adjust the middle voltage.

11. The method of claim 10, wherein the step of adjusting the middle voltage includes:

converting the input voltage indicator and the output voltage indicator to current signals before the subtracting step.

12. The method of claim 8, wherein when Vin>Vout, Vm=Vin+ΔV.

13. The method of claim 8, wherein the step of adjusting the middle voltage includes:

comparing (1) the input voltage indicator and one of (2a) the output voltage indicator and (2b) the predetermined first reference signal; and selecting the second reference signal to be provided to the voltage regulator according to the comparison result.

* * * * *